Patented Sept. 25, 1951

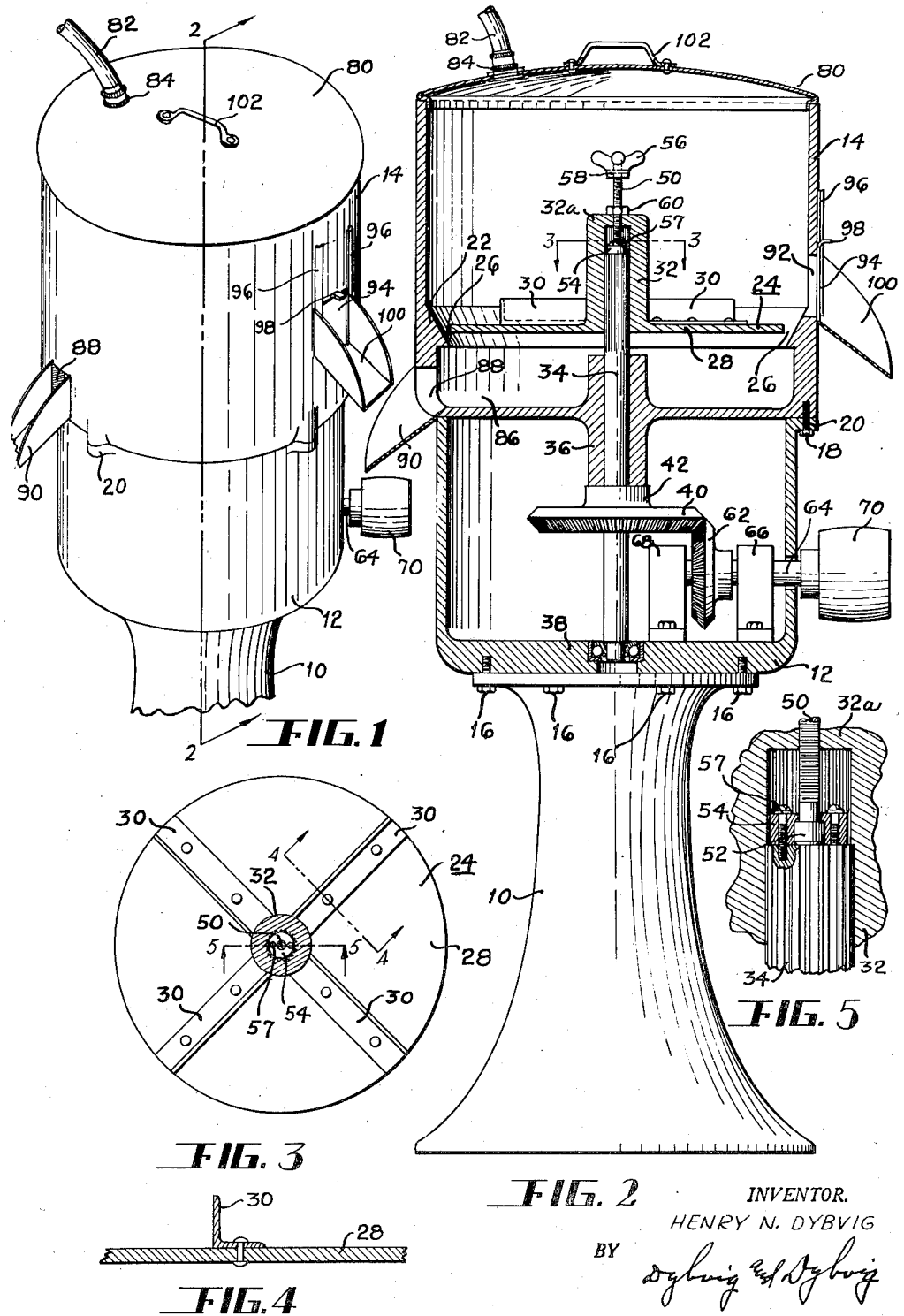

2,569,156

UNITED STATES PATENT OFFICE 2,569,156

MACERATOR FOR HULLING PITS OR SEEDS

Henry N. Dybvig, near Colton, S. Dak.

Application March 11, 1949, Serial No. 80,868

5 Claims. (Cl. 146—76)

1

This invention relates to a macerator and more particularly a macerator for separating the pulp from the pits or stones to be used for seed purposes.

An object of this invention is to provide a device for removing the pulp from seed pits such as the pulp from the pits of plums, cherries, cedars, walnuts and other fruits, nuts or seeds, the pits of which are planted by nurserymen in producing seedlings.

This device may be referred to as a batch macerator, in that a batch of fruit or seeds is placed in a hopper, the bottom of which is provided with a rotatably mounted beater or agitator which subjects the seeds to centrifugal forces, the beater being provided with upwardly directed blade-like projections, radially or spirally disposed, to throw the seeds against the wall of the hopper, a stream of water being added to the hopper, the water, together with the pulp draining through an annular slot or groove located between the margin of the beater and the wall of the hopper to drain the dislodged pulp from the batch, so that as the operation continues all of the pulp is removed from the pits, the pulp being washed away, draining through a suitable spout provided therefor in the bottom of the hopper below the beater. When the batch has been cleansed, the pits are removed through a side door or opening provided with a suitable closure, so as to put the device in readiness for another batch. A frustrum conical ring surrounds the beater and is so arranged that by adjusting the beater upwardly or downwardly, the width of the slot surrounding the beater is varied.

Another object of this invention is to provide a macerator that removes the pulp from pits and thoroughly washes the pits without cracking or mutilating the pits, which device is easily produced, is efficient, dependable and at the same time sturdy.

Other objects and advantages reside in the construction of parts, the combination thereof and the mode of operation, as will become more apparent from the following description.

Referring to the drawings, Figure 1 is a fragmentary, perspective view of a macerator.

Figure 2 is a transverse, cross sectional view taken substantially on the line 2—2 of Figure 1.

Figure 3 is a cross sectional view taken substantially on the line 3—3 of Figure 2.

Figure 4 is a fragmentary, cross sectional view taken substantially on the line 4—4 of Figure 3.

Figure 5 is a fragmentary, cross sectional view taken substantially on the line 5—5 of Figure 3.

2

In the drawings, the reference character 10 designates a base or pedestal supporting a gear housing 12 mounted between the base or pedestal 10 and the hopper 14. Suitable bolts or screws 16 are used to fixedly secure the gear housing 12 to the base 10. Bolts or screws 18 passing through suitable lugs 20 integral with the gear housing 12 are used in securing the hopper 14 to the gear housing.

In the embodiment shown herein, the base 10, the gear housing 12 and the hopper 14 have been shown as made from castings. Instead of these parts being made of castings, they could be fabricated from sheet metal, welded or otherwise secured together.

The hopper 14 is provided with a frustrum conical, ring-like, inwardly directed portion 22. In the embodiment shown, this ring-like portion has been shown as integral with the hopper. It could be a separate member secured in position in any suitable manner. This inwardly directed, ring-like projection cooperates with a beater or impeller 24 to form an annular slot, groove or opening 26.

The beater 24 includes a plate-like base 28, having mounted thereon a plurality of radially disposed angle bars 30. The plate-like base 28 is secured by welding, or in any other suitable manner, to a capped tubular member 32, provided with internally disposed splines engaging the splines on a centrally disposed shaft 34 mounted in a bearing portion 36 in the base of the hopper 14. The shaft 34 extends downwardly and is journalled in end thrust bearings 38 to prevent endwise movement of the shaft 34. A bevelled gear 40 is keyed to the shaft 34. The bevelled gear 40 is provided with a hub portion 42 seated against the lower end of the bearing portion 36, so as to prevent the shaft 34 from raising upwardly through the bearing portion 36.

In order to provide axial adjustment of the beater 24 with respect to the shaft 34, the cap 32a of the tubular member 32 is threaded so as to receive an adjusting screw 50, provided with an annular collar or ring 52 rotatably mounted in a collar 54 having a shouldered recess and being connected to the shaft 34 by screws 57. Instead of using the annular collar on the lower end of the screw, a ball and socket connection could be used for connecting the screw to the end of the shaft.

The upper end of the screw 50 threadedly receives a hand wheel 56 held in position by a suitable pin or key 58 passing through the hub of the hand wheel 56 and through an aperture near the upper end of the screw 50. It can readily be seen that by manually rotating the screw 50, the beater 24 may be raised upwardly or downwardly, as the case may be, so as to adjust the width of the slot 26. The width of the slot is less than, but not much less than the minimum dimension of the pits that are being treated. If, for example, black walnuts are to be hulled, the opening or slot 26 is preferably very large, on the order of one inch in width. On the other hand, if, for example, seeds from cedars are to be hulled, the beater must be adjusted downwardly so as to provide a slot only a very small fraction of an inch in width. This adjustment is accomplished by adjusting the screw 50. The beater forms a bottom for the seeds or pits.

After the screw 50 has been adjusted, it is preferably locked in position by means of a lock nut 60 that is tightened against the cap 32a.

Instead of adjusting the beater upwardly and downwardly, a frustrum conical collar surrounding the beater could be formed from a separate piece and this collar adjusted upwardly or downwardly, as the case might require, to thereby adjust the width of the slot. Furthermore, instead of using a frustrum conical ring surrounding the beater, a ring so designed that the diameter of the ring could be increased or decreased could be used.

The cover 80 is provided with a nozzle 84 adapted to have attached thereto a hose 82 for supplying water to the batch of fruit or nuts to be macerated. A compartment 86 located below the beater 24 is provided with an outlet drain or opening 88 communicating with a spout 90, through which the pulp, together with the water, is drained.

The side wall of the hopper 14 is provided with an opening 92 normally closed by a door or closure 94 mounted for sliding movement in a pair of guides 96. The door or closure 94 is provided with a finger grip member or handle 98 for use in opening and closing the door or closure. The pits, upon the macerating or hulling operation being completed, are ejected from the hopper through the opening 92 and guided into a suitable vessel or container by a spout 100.

After a batch of fruit or seeds has been placed in the macerator, the beater 24 is rotated by a mechanism that will now be described. The bevelled gear 40 meshes with a pinion 62 keyed to a shaft 64 journalled in bearings 66 and 68. The outer end of the shaft 64 supports a suitable pulley 70 keyed thereto. This may be a flat-face pulley in the event the prime mover is provided with a flat-face pulley, such as farm tractors and the like. On the other hand, if the prime mover is provided with a V-belt pulley or pulleys, a V-belt pulley or pulleys could be substituted for the pulley 70.

*Mode of operation*

Upon the removal of a cover or lid 80 a batch of seeds or pits, together with their hulls or pulp, is placed in the hopper 14. When the batch has been placed in the hopper the beater 24 is rotated through the prime mover driving the pulley 70 and the mechanism driven thereby. This agitates the batch, sending the fruit or seeds outwardly against the wall of the hopper by means of centrifugal force, so as to macerate or fracture the pulp. Water may be supplied to the batch through the hose 82, to thereby flush the removed pulp or hulls, as the case may be, through the slot 26 into the compartment 86 located below the beater 24, the pulp or hulls being drained from the compartment 86 through the opening 88. After completing the hulling of the pits, the side door or closure 94 is opened. The seeds or pits are thrown outwardly by the beater 24, escaping through the opening 92 through the spout into a suitable vessel or container. The water is preferably turned off before opening the door 94. Upon the seeds being removed, the door 94 may be closed, the lid 80 removed by means of the handle 102, a new batch put into the hopper and the operation repeated.

Other macerators have been used in the past, such macerators performing a grinding operation, to thereby remove the hulls or the pulp. This grinding action is severe and with some makes of macerators approximately ten percent of the seeds are cracked or injured, resulting in a loss. That being the case, many nurseries, especially when seeds are scarce, employ hand labor to hull the seeds. One man can remove the pulp from some over three bushels of plums in one day, which is considered a good day's work. The macerator disclosed herein can macerate the pulp on the same type of seed at the rate of six to ten bushels per hour without cracking or injuring any of the seeds. Furthermore, it has been found very effective on types of seeds having an extremely tough hull or pulp surrounding the seed, as for example, seeds from cedar trees, walnuts, et cetera. The macerator disclosed herein has been found very effective in hulling cedar seeds and black walnuts.

Although the preferred embodiment discloses a beater provided with radially disposed blade-like projections, any other suitable type of beater could be used, as for example, a beater provided with spiral ribs or grooves, used in imparting centrifugal force to the seeds being treated.

Although the preferred embodiment of the device has been described, it will be understood that within the purview of this invention various changes may be made in the form, details, proportion and arrangement of parts, the combination thereof and mode of operation, which generally stated consists in a device capable of carrying out the objects set forth, as disclosed and defined in the appended claims.

Having thus described my invention I claim:

1. A macerator for use in hulling seeds or pits embedded in pulp, said macerator including a hopper, said hopper being provided with an inwardly directed smooth ring-like portion in spaced relation from the bottom thereof, said ring-like portion having a frustrum-conical inner surface with the maximum width at the top of the ring-like portion, a beater rotatably mounted within said ring-like portion, the bottom of the beater simulating a disc having agitating means projecting upwardly therefrom, said beater having a peripheral portion in spaced relation from the ring-like portion so as to form a slot surrounding the beater, adjustable means for adjusting one of said portions axially with respect to the other of said portions to thereby adjust the width of the slot so that the width of the slot is less than but not much less than the minimum thickness of the seeds or pits to be hulled, and means for rotating the beater so as to agitate the seeds or pits and the pulp surrounding the seeds or pits so as to cause the pulp to become macerated and dislodged from the seeds or pits, the hulls passing through the slot, the seeds or pits remaining above the beater.

2. A batch macerator for use in hulling seeds or pits embedded in pulp, said macerator including a hopper, said hopper being provided with an inwardly directed ring-like portion mounted in spaced relation from the bottom of the hopper, said ring-like portion having a frustrum-conical inner smooth surface with the maximum width at the top of the ring-like portion, a beater rotatably mounted within said ring-like portion, said beater including a disc-like bottom portion having upwardly directed agitating means, the beater cooperating with the ring-like portion to form an annular slot, adjustable means for supporting the beater, the adjustment of said adjustable means raising or lowering the beater so as to increase or decrease the width of the slot, the slot being preferably adjusted so as to have a width less than but not much less than the minimum thickness of the seeds or pits to be hulled, and means for rotating the beater so as to agitate the seeds or pits and the pulp surrounding the seeds or pits so as to cause the pulp to become macerated and dislodged from the seeds or pits the hulls passing through the slot, the seeds or pits remaining above the beater.

3. A batch macerator for use in hulling seeds or pits embedded in pulp, said macerator including a hopper having a smooth inner surface, said hopper being provided with an inwardly directed ring-like portion mounted in spaced relation from the bottom of the hopper, said ring-like portion having a frustrum-conical inner surface with the maximum width at the top of the ring-like portion, a beater rotatably mounted within said ring-like portion, said beater including a disc-like bottom portion having upwardly directed agitating means, the beater cooperating with the ring-like portion to form an annular slot, adjustable means for supporting the beater, the adjustment of said adjustable means raising or lowering the beater so as to increase or decrease the width of the slot, the slot being preferably adjusted so as to have a width less than but not much less than the minimum thickness of the seeds or pits to be hulled, means for rotating the beater so as to agitate the seeds or pits and the pulp surrounding the seeds or pits so as to cause the pulp to become macerated and dislodged from the seeds or pits, and means for adding water to the batch in the hopper so as to flush the pulp through the slot surrounding the beater, the seeds or pits remaining on top of the beater.

4. A batch macerator for use in hulling seeds or pits embedded in pulp, said macerator including a hopper having a smooth inner surface, said hopper being provided with an inwardly directed ring-like portion mounted in spaced relation from the bottom of the hopper, said ring-like portion having a frustrum-conical inner surface with the maximum width at the top of the ring-like portion, a beater rotatably mounted within said ring-like portion, said beater including a disc-like bottom portion having upwardly directed agitating means, the beater cooperating with the ring-like portion to form an annular slot, a splined shaft rotatably mounted in the bottom of the hopper having the splined end projecting upwardly, a tubular housing provided with internal splines mounted on said shaft, said housing supporting the beater, means for adjusting the housing axially with respect to the shaft to thereby adjust the beater with respect to the frustrum-conical ring-like portion to increase or decrease the width of the slot, and means for rotating the shaft to thereby rotate the beater so as to agitate the seeds or pits and the pulp surrounding the seeds or pits to cause the pulp to become macerated and dislodged from the seeds or pits the hulls passing through the slot, the seeds or pits remaining above the beater.

5. A batch macerator for use in hulling seeds or pits embedded in pulp, said macerator including a hopper having a smooth inner surface, said hopper being provided with an inwardly directed ring-like portion mounted in spaced relation from the bottom of the hopper, said ring-like portion having a frustrum-conical inner surface with the maximum width at the top of the ring-like portion, a beater rotatably mounted within said ring-like portion, said beater including a disc-like bottom portion having upwardly directed agitating means, the beater cooperating with the ring-like portion to form an annular slot, a splined shaft rotatably mounted in the bottom of the hopper having the splined end projecting upwardly, a tubular housing provided with internal splines mounted on said shaft, said housing supporting the beater, means for adjusting the housing axially with respect to the shaft to thereby adjust the beater with respect to the frustrum-conical ring-like portion to increase or decrease the width of the slot, means for rotating the shaft to thereby rotate the beater so as to agitate the seeds or pits and the pulp surrounding the seeds or pits to cause the pulp to become macerated and dislodged from the seeds or pits, and means for adding water to the batch in the hopper so as to flush the pulp through the slot surrounding the beater, the seeds or pits remaining on top of the beater.

HENRY N. DYBVIG.

REFERENCES CITED

The following references are of record in the file of this patent:

UNITED STATES PATENTS

| Number | Name | Date |
|---|---|---|
| 23,431 | Selser | Mar. 29, 1859 |
| 42,371 | Hepburn | Apr. 19, 1864 |
| 309,189 | Belvney | Dec. 16, 1884 |
| 859,842 | Robinson | July 9, 1907 |
| 1,923,806 | Anstiss | Aug. 22, 1933 |

FOREIGN PATENTS

| Number | Country | Date |
|---|---|---|
| 676,448 | France | Nov. 28, 1929 |